United States Patent Office 3,063,243
Patented Nov. 13, 1962

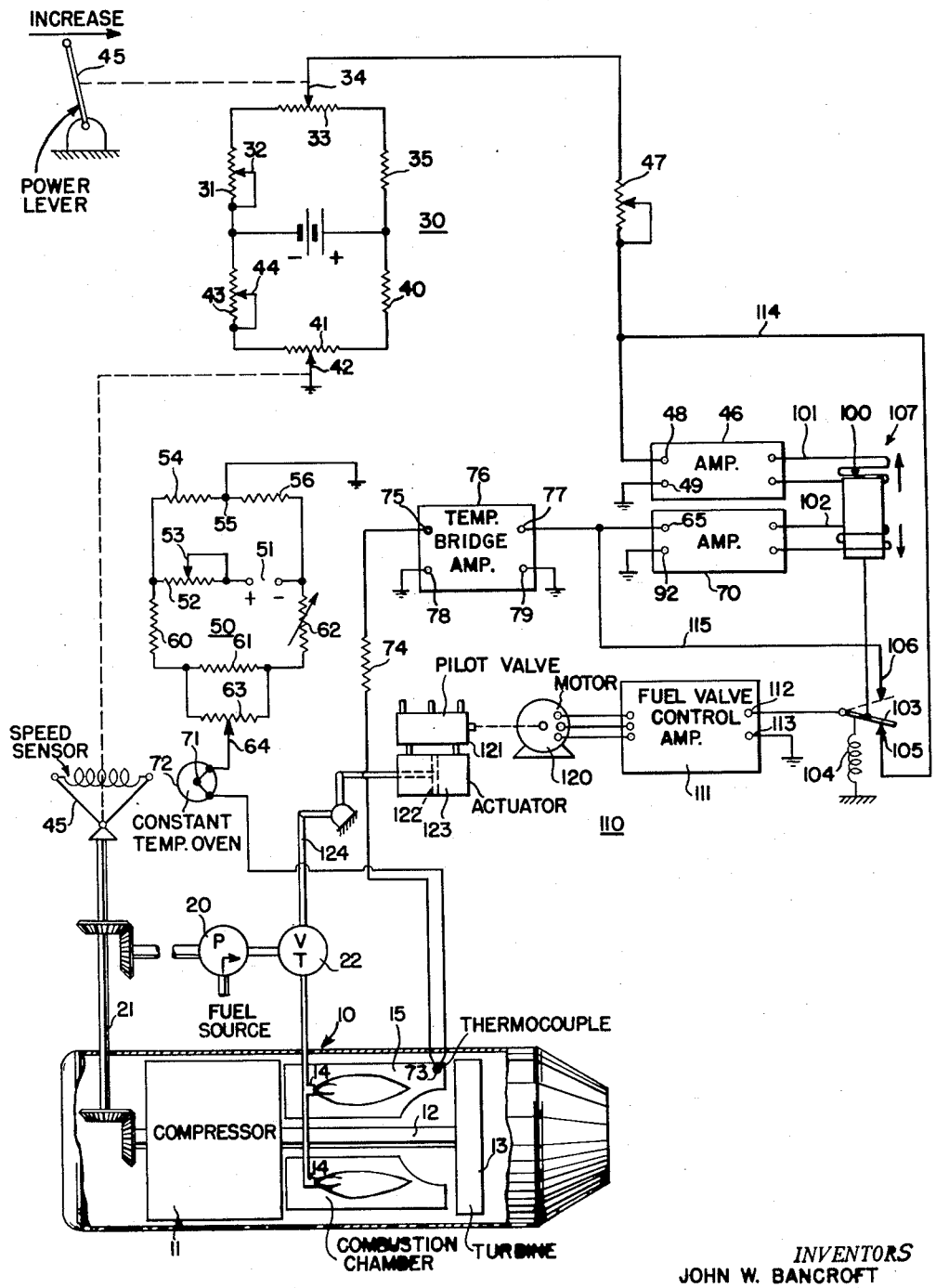

3,063,243
ACCELERATION FUEL CONTROL FOR A JET ENGINE
John W. Bancroft and Dean L. Huppert, Minneapolis, Minn., assignors to Minneapolis-Honeywell Regulator Company, Minneapolis, Minn., a corporation of Delaware
Filed Mar. 1, 1954, Ser. No. 412,998
2 Claims. (Cl. 60—39.28)

The present invention is concerned with an improved control apparatus for controlling the fuel flow of a combustion engine of the gas turbine type, in particular, apparatus for controlling fuel flow with respect to engine speed and engine temperature for obtaining maximum acceleration in engine speed.

In the present gas turbine engines it is desired to provide for fuel control normally in response to engine speed; however, upon a call for acceleration the fuel flow must be limited to prevent excessive temperatures in the combustion chamber and still provide for maximum acceleration. In the invention disclosed in the copending application Benjamin H. Ciscel et al., Serial No. 157,304, filed April 21, 1950, now Patent No. 2,760,337, the fuel flow to a combustion engine is normally controlled by an engine speed bridge network circuit; however, when the speed error or deviation between selected speed and actual engine speed exceeds a predetermined value a relay disconnects the speed bridge and connects an engine temperature bridge network circuit in a controlling relation to the fuel flow control apparatus. Acceleration is then obtained without exceeding the destructive engine temperature limit until the speed error drops to reconnect the speed bridge in control of fuel flow.

The present invention includes an improved control apparatus which provides for maximum acceleration of the engine speed as the fuel flow is placed under the engine temperature control whenever there is a desire for an appreciable increase in the engine speed. In particular a d.fferential relay is used to connect either an engine speed bridge or an engine temperature bridge to a fuel flow control apparatus depending on which of the bridges has the more influential output signal; however, when the output signals of the two bridges are equal, the relay is normally biased so as to connect the speed bridge to the fuel flow control apparatus.

It is therefore an object of the present invention to provide an improved control apparatus for controlling the fuel flow of a combustion engine of the gas turbine type.

Another object of the present invention is to provide an improved control apparatus for controlling the fuel flow to a combustion engine of the gas turbine type in which maximum acceleration of the engine is obtained by placing the fuel flow under the direct control of engine temperature whenever a change in speed is desired.

A further object of the present invention is to provide control apparatus for normally controlling fuel flow to a combustion engine in response to engine speed; however, to obtain maximum acceleration of engine speed, fuel flow is transferred to be controlled in response to engine temperature upon the existence of a predetermined speed error and a predetermined engine temperature.

These and other objects will be apparent upon a consideration of the accompanying specification, claims and drawings, of which:

The single figure of the drawing is a schematic showing of the present control apparatus for a combustion engine of the gas turbine type.

Referring to the figure, the control apparatus is arranged to control the fuel flow to a combustion engine 10 of the gas turbine type which has a compressor 11 driven through a shaft 12 by a turbine 13. The turbine is propelled by the pressure developed upon the combustion of fuel flowing from nozzles 14 and burning in the combustion chamber 15. Fuel is delivered to the nozzles 14 from a fuel source, not shown, by a pump 20 driven by a mechanical connection 21 to the engine shaft 12. A throttle valve 22 controls the rate of fuel flow.

A speed bridge 30 has a D.C source of power to which two parallel branches are connected, the first branch comprising a resistor 31 having a movable wiper 32 for shorting a portion of the resistor out of the circuit, a resistor 33 having a movable wiper 34 thereon, and a resistor 35; a second branch comprising a resistor 40, a resistor 41 having a movable wiper 42 thereon, and a resistor 43 having a movable wiper 44 for shorting a portion of the resistor out of the circuit. Wiper 34 is connected to a manual control lever 45 so that movement of the lever changes the position of wiper 34 and thus the output of the speed bridge, the adjustment of wiper 32 providing for the calibration of the manual power lever setting. Wiper 42 is connected to a speed sensor or governor 45 that is also mechanically coupled by connection 21 to the engine shaft so that the engine speed or rotation of shaft 12 effectively positions wiper 42 on resistor 41, wiper 44 providing for the calibration of the speed sensor. The output of the bridge is connected to a conventional magnetic or electronic amplifier 46 by a variable gain adjustment resistor 47 connected between wiper 34 and an input terminal 48 of the amplifier. Wiper 42, as well as a second input terminal 49 of the amplifier, is grounded. With the selected speed equal to the actual speed, as the bridge is shown, the output of the bridge is zero, however, movement of wiper 34 to the right provides a positive output signal until wiper 42 is moved sufficiently to the right upon an increase in engine speed by sensor 45 to again balance the bridge. A movement of wiper 42 to the right past the balance position upon overspeed of the engine provides a negative output.

A temperature bridge 50 has a source of D.C. power 51 having two parallel branch circuits connected thereto, a first branch comprises a resistor 54, a grounded output tap 55, and resistor 56. A resistor 52 having a movable wiper 53 is in series with the power source and is common to both of the parallel branches. A second branch comprises a resistor 60, a resistor 61 and a variable resistor 62 for bridge calibration purposes. Connected in parallel with resistor 61 is a resistor 63 having a movable output wiper 64 thereon for less critical bridge calibration purposes. A thermocouple junction 71 connected to wiper 64 is located in a constant temperature oven 72 for maintaining the temperature of the junction at a predetermined temperature, the oven temperature control network being of the conventional type (not shown). A second junction 73 is located in the combustion chamber of engine 10 and is connected in series with junction 71 and a resistor 74 and an input terminal 75 of a conventional amplifier 76. The output terminal 77 of amplifier 76 is connected to an input terminal 65 of an amplifier 70 similar to amplifier 46, a second input terminal of amplifier 70 is grounded. A second input terminal 78 and an output terminal 79 of amplifier 76 are also grounded.

Upon the proper adjustment of wiper 64 and variable resistor 62 the temperature bridge is calibrated to provide a predetermined output signal, which is amplified by the amplifier, at various temperatures of the combustion chamber 15. As set up for this illustration, the temperature bridge has a positive output as the temperature in the combustion chamber is lower than the maximum temperature selected by the predetermined calibration of the bridge. Upon an increase in the engine temperature above the maximum temperature, the bridge output becomes negative.

A differential relay 100 has two windings 101 and 102 that are connected to the output terminals of amplifiers 46 and 70 respectively, the windings being so arranged that when the outputs of the amplifiers are equal the resultant force on a movable core 107 and an associated transfer switch blade 103 is zero and blade 103 is biased by a spring 104 against a contact 105. The arrows that are adjacent the relay indicate the direction of influence of the windings 101 and 102 on the movement of core 107 whenever the output of the temperature bridge and speed bridge is positive. As illustrated, winding 101 has no effect as speed bridge 30 is balanced and its output is zero. The engine temperature is below the maximum temperature and the output of temperature bridge 50 is positive resulting in a downward force on core 107 to assist spring 104 in holding blade 103 against contact 105 which is connected to wiper 34 of the speed bridge. Whenever the output of the speed bridge is positive and the force developed by winding 101 exceeds the force developed by winding 102 and spring 104, the core and blade 103 is moved upward to engage contact 106 which is connected to terminal 77 of the temperature bridge amplifier. It is apparent that the position of blade 103 depends on the resultant force on core 107, this force being dependent upon the output signals of the temperature bridge and the speed bridge.

A fuel valve control apparatus 110 includes an amplifier 111 having a pair of input terminals 112 and 113, terminal 113 being connected to ground. Either speed bridge 30 or temperature bridge 50 is selectively connected to input terminal 112 upon the operation of blade 103. The output of amplifier 111 is connected to a motor 120 which positions a pilot valve 121 in a hydraulic servo mechanism to control the position of a piston 122 in a hydraulic actuator 123. The piston 122 is connected by a linkage 124 to throttle valve 22 so that the fuel flow to burner 14 is controlled by the output of the fuel valve control amplifier. The motor 120 and amplifier 111 are preferably of a type similar to the disclosure in the W. C. Wills Patent 2,423,540 issued July 8, 1947, which shows an amplifier having a D.C. input and an A.C. output to a reversible motor but any arrangement capable of similar function may be used. Whether connected to the speed bridge or the temperature bridge, the reversible motor 120 operates to open or close the fuel valve through the hydraulic system in response to the bridge output. With a positive signal to amplifier 111 the motor is operated in a direction to open the fuel valve, it being operated to close the fuel valve upon the amplifier receiving a negative signal. As the polarity of the output of each bridge, more especially the temperature bridge as temperature changes rapidly, changes from positive to negative or vice versa, valve 22 rapidly moves toward a closed or open position respectively.

*Operation*

As shown, the engine is operating under normal steady state conditions, the engine speed being that speed selected by the power lever and the engine temperature being somewhat lower than the maximum temperature that is safely allowable in the combustion chamber. During transient operation when the power lever is moved to the right to increase the selected speed, the output voltage of the speed bridge becomes positive and an upward force is developed on core 107 by winding 101. The effectiveness of this force depends on the amount of downward force resulting from winding 102, therefore when the steady state temperature is low the speed error signal must be large before blade 103 of the transfer switch is moved upward to connect the fuel flow control apparatus to the temperature bridge.

With the output of the speed bridge sufficiently large enough to overcome the effect of the temperature bridge on relay 100, the temperature bridge is connected to control the fuel flow to provide for maximum acceleration of the engine speed without allowing the existence of an abnormal combustion chamber temperature. The fuel flow is controlled by the temperature bridge until the speed error approaches zero where the upward force on core 107 due to winding 101 is insufficient to maintain blade 103 engaging contact 106 and the speed bridge is again connected to control the fuel flow for steady state operation.

During steady state operation the temperature of the combustion chamber is sometimes relatively high, especially under heavy load conditions or when the inlet air temperature is high. Under such conditions the engine temperature is close to the maximum engine temperature and the temperature bridge output, while positive, is small. Upon a need for an increase in speed a very small positive speed bridge output is needed to control the relay therefore a small movement of the power lever to the right results in movement of blade 103 upward to connect the temperature bridge to the fuel flow control apparatus. The transfer to temperature control is accomplished with smaller speed error signals as the engine temperature approaches the maximum temperature selected for proper operation of the engine. The varying conditional transfer provides for an improved control in that fuel flow is normally controlled by speed for a greater amount of the engine operation regime in particular when the steady state operation temperature is relatively low, the transfer to temperature control being only accomplished when a large speed error is present. When the steady state operating temperature is high, the transfer to temperature control of fuel flow is accomplished with small speed errors, this being advantageous as the combustion engine temperature rapidly changes and it quickly rises to a destructive value. While maximum fuel flow and thus acceleration can exist when fuel flow is controlled by speed, especially during periods where the steady state engine temperature is low, maximum acceleration through the complete transient range exists as once the speed error is sufficient to transfer the fuel control to the temperature bridge it remains in such manner until the engine is up to the new steady state speed.

During deceleration both the speed bridge and the temperature bridge have outputs which force blade 103 downward thus the fuel flow apparatus is connected to the speed bridge. This provides for adequate control of the fuel valve almost directly by power lever position to effect rapid deceleration.

While I have shown a specific form of engine control apparatus, it is to be understood that this is for illustrative purposes only and that the invention is to be limited by the scope of the appended claims.

We claim as our invention:

1. In control apparatus for controlling the operation of a combustion engine of a gas turbine type, a first circuit including means responsive to engine temperature so that an output of said circuit is indicative of the engine temperature, a second circuit including engine speed selecting means and engine speed responsive means so that an output of said second circuit is indicative of the difference between a desired engine speed and actual engine speed, amplification means, first connection means connecting said first and second circuits to said amplification means, relay means operable in opposite directions, said relay means being normally biased in a speed controlling first direction, second connection means connecting said amplification means in controlling relation to said relay means in such a manner that an engine undertemperature tends to operate said relay means in said first direction and an overtemperature tends to operate said relay means in a second and opposite direction and where an engine underspeed condition tends to operate said relay means in said second direction while an overspeed condition tends to operate said relay means in said first direction, engine fuel controller means for controlling the flow of fuel to the engine, and third connection means including said relay means for selectively connecting said first or second circuits in a controlling relation to said fuel controller means, said second circuit normally being effective through said third connection means when said relay means is operated in said first direction to control the flow of fuel to the engine but upon the output of the second circuit becoming more influential than the output of said first circuit and upon operation of said relay means in said second direction, said first circuit will operate through said third connection means to control fuel flow.

2. In engine control apparatus for controlling the fuel flow to the engine, fuel flow control means, engine speed responsive means, engine temperature responsive means, automatic control means including switching means operable responsive to the outputs of said speed responsive means and said temperature responsive means in such manner that underspeed and overtemperature tend to operate said switching means in one direction and overspeed and undertemperature tend to operate said switching means in an opposite direction, circuit means including said automatic control means for selectively connecting either said engine speed responsive means or said engine temperature responsive means through said switching means in controlling relation to said fuel flow control means, and mechanical bias means normally biasing the switching means of said automatic control means so as to connect said speed responsive means to said fuel flow control means.

References Cited in the file of this patent

UNITED STATES PATENTS

| | | |
|---|---|---|
| 2,282,526 | Moore | May 12, 1942 |
| 2,589,074 | Goodwin | Mar. 11, 1952 |
| 2,623,354 | Best | Dec. 30, 1952 |
| 2,648,194 | Jorgensen et al. | Aug. 11, 1953 |
| 2,662,372 | Offner | Dec. 15, 1953 |
| 2,697,908 | Offner | Dec. 28, 1954 |
| 2,739,441 | Baker et al. | Mar. 27, 1956 |
| 2,764,867 | Farkas | Oct. 2, 1956 |